Jan. 20, 1970  B. J. MASSARI  3,490,362
DIE PLATE FOR EMBOSSING AND CUTTING
Filed Dec. 15, 1967

INVENTOR
BERNARD J. MASSARI
BY
ATTORNEY 3,490,362
Patented Jan. 20, 1970

3,490,362
DIE PLATE FOR EMBOSSING AND CUTTING
Bernard J. Massari, 725 Hart Drive,
Somerville, N.J. 08876
Continuation-in-part of application Ser. No. 618,540,
Feb. 24, 1967. This application Dec. 15, 1967, Ser.
No. 697,264
Int. Cl. B44b 5/02
U.S. Cl. 101—28    5 Claims

ABSTRACT OF THE DISCLOSURE

A die plate having a die cutting ridge with rounded cutting surface, the rounded cutting surface having a radius of from about .003 inch to about .0075 inch with a preferred range of from about .004 inch to about .006 inch which embosses and cuts a laminar tape, wherein the outer layer of the tape is relatively thin and flexible and is embossed, and an intermediate or second layer is relatively inflexible and is cut.

Cross references to related applications

This invention is a continuation-in-part of my parent applications, Ser. No. 618,540, filed Feb. 24, 1967, and abandoned application Ser. No. 654,768, filed July 20, 1967.

Background of the invention

This invention relates to the area of embossing and cutting with particular reference to the formation of stencils and relates generally to the printing art.

Devices and techniques for cutting letters and forming stencils are well known but prior to this invention there have been no techniques by which desired letters may be cut in sequence and supported in a desired sequential positioned relation on a carrier tape or strip to be transferred therefrom to a permanent backing support in the same positioned arrangement to produce the desired printing or ornamentation. United States Patents 666,468, 1,636,546, 2,370,186 and 2,549,847 may be considered as typical of the closest prior art with which applicant is familiar.

Summary

In accordance with the invention, a die plate is provided with a die cutting ridge, the ridge having a rounded upper or outer cutting surface wherein the range of the radius of the rounded cutting surface is from about .003 inch to about .0075 inch. The die plate and a three layer laminated tape are adapted to pass through pressure rolls. The three layer laminated tape is provided with an upper relatively thin and highly flexible carrier layer that will stretch without being separated or cut while being embossed by the cutting ridge. The intermediate or stencil layer of the tape is thicker than the upper layer and is relatively inflexible, in relation to the outer lawer, so that it is separated and cut by the rounded cutting ridge of the die and the die surface is impressed through the upper flexible carrier without cutting the upper layer. The lower or support layer of the tape is formed of a relatively thick, hard and inflexible material that will not be cut unless the raised die surface is higher than the thickness of both the intermediate and lower laminate layers as desired. To enable the selective stripping and adherence of the tape layers after embossing and cutting, the undersurface of each layer except the lower layer may be provided with a pressure sensitive adhesive coating. It is desirable that the adhesive coating on the undersurface of the intermediate layer have a greater tackiness than that of the upper outer layer so that the cut letters or ornamentation of the intermediate layer as supported on the upper carrier layer may be affixed to a permanent supporting surface following which the upper layer may be stripped from the intermediate layer to leave the cut printing or ornamentation of the intermediate layer affixed to the permanent support surface. To further facilitate the desired stripping of the tape layers, suitable release coatings may be applied to the upper surface of the lower and intermediate layers. In addition, if desired, the undersurface of the intermediate layer may be provided with a carbon black or ink transfer coating to produce printing on the upper surface of the lower support layer when the upper layer is embossed and the intermediate layer cut.

In order to obtain the desired embossing without cutting of the upper layer and the cutting of the inner layer alone or along with the lower layer of the tape laminate, a die comprising a sheet of metal or plastic, preferably metal, constitutes the support plate which has a raised and rounded die cutting and embossing ridge formed of the suitable shape. The rounded embossing and cutting surface is the main feature of the present invention since such rounded surface will emboss and stretch the upper flexible tape layer without cutting it while penetrating into and separating to cut the relatively inflexible intermediate layer and if the die cutting and embossing ridge is greater than the combined thickness of the intermediate and lower layers, both such layers will be separated and cut by the die.

Description of the preferred embodiments

Figure 1:
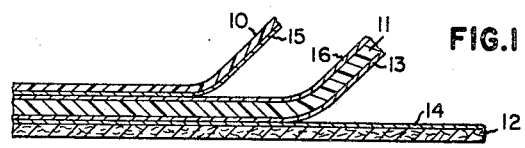
FIG. 1 is a longitudinal sectional view of a portion of a preferred form of the laminar printing tape of the invention.

Referring to FIG. 1 of the drawings, a presently preferred embodiment of the laminar printing tape of the invention is shown. The upper carrier layer 10 is formed of a relatively thin and highly flexible material such as a bi-axially oriented film of polyethylene terephthalate, an example of which is available from the Du Pont Corporation under the trade name "Mylar." It has been found that the upper or carrier layer 10 when formed of the so-called polyester material as referred to above should have a thickness of approximately .001 inch although some thicker or thinner films may be used provided that they will stretch without being cut during the embossing operation and that they can be easily handled during separation of the tape layers. A preferred characteristic of the polyester film for the upper layer 10 is that it is transparent. The intermediate printing layer 11 is formed of a relatively thick and inflexible material such as a film of cellulose acetate having a thickness of .003 inch to .004 inch. Other materials both plastic or paper may be used in place of the cellulose acetate for the intermediate layer provided that they have the requisite characteristics of relative inflexibility and medium hardness as provided by cellulose acetate films. For example, thin coated or impregnated paper such as carbon paper may be used for the intermediate layer. The lower support layer 12 is formed of a semi-hard relatively inflexible coated paper of relative greater thickness to the thickness of the upper carrier layer 10 and may preferably have a thickness of about .004 inch.

The lower or undersurface of the intermediate layer 11 is provided with a pressure sensitive adhesive coating 13 of any suitable formulation, many of which are well known to those skilled in the art. The upper surface of the lower support layer 12 is provided with a suitable release coating 14 which will prevent the intermediate layer 11 from adhering to the support layer 12 when the layers are separated as shown. Various release agents depending upon the type of pressure sensitive adhesive coatings to be used are well known to those skilled in the art and they need not be listed herein. The undersurface of the upper carrier layer 10 is also provided with a pressure sensitive adhesive coating 15 and the upper surface of the intermediate layer 11 is likewise provided with a release coating 16. However, it is very important to point out that the relative characteristics for the adhevise coatings 13, 16 and the release coatings 14, 16 should be selected to be such that layers 10 and 11 will adhere to each other while layer 12 is separated from layers 10 and 11 and such that layer 11 will subsequently adhere to a surface not provided with a release coating while layers 10 and 11 are being separated. In other words, the adhesive coating for the intermediate layer should have a greater tackiness than the adhesive coating for the upper layer 10. This desirable function will later be referred to in more detail.

Figure 2:
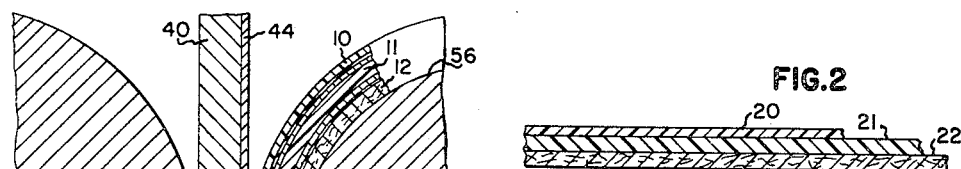
FIG. 2 is a view similar to FIG. 1 of a modified form of laminar printing tape of the invention.

A modified form of laminar tape of the invention is shown by FIG. 2 of the drawings in which the upper layer 20, intermediate layer 21 and lower layer 22 are the same as layers 10, 11, 12 or FIG. 1 except that no adhesive or release coatings on the various layers are provided. This form of the tape of the invention is useful when it is desired to produce a stencil with cut-out portions from the intermediate layer 21. Also, if the intermediate layer is comprised of carbon paper or the like, printing can be obtained on the upper surface of the lower layer 22 at the same time a stencil is formed of the intermediate layer 21. Of course, the stencil or cut-out portions formed from the intermediate layer may be caused to adhere to an adhesive coated surface to provide a desired ornamentation or printing.

Figure 4:
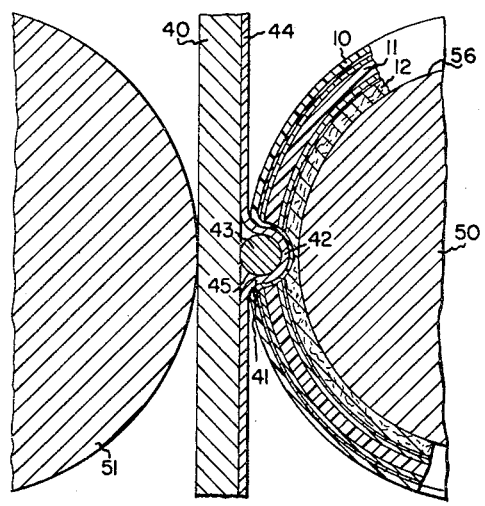
FIG. 4 is a fragmentary sectional view showing the printing tape together with a die plate received between the pressure rollers of the apparatus of the invention at the time that the intermediate tape layer is cut.
Figure 3:
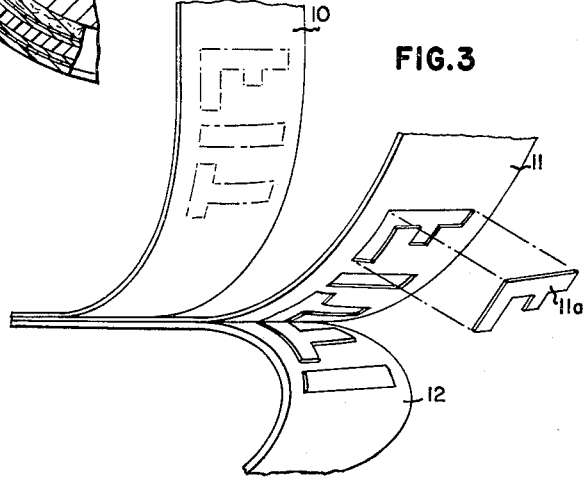
FIG. 3 is an exploded perspective view of the laminar printing tape after cutting and as its layers may be separated.

FIG. 3 of the drawings shows how the upper carrier layer 10 remains uncut but is embossed with a suitable design while the intermediate layer 11 is cut to form a cut-out portion 11a while the lower support layer 12 is also not cut, the same as the upper layer 10. FIG. 4 of the drawings shows in detail how the aforementioned embossing and cutting of the various tape layers is obtained by using the preferred form of die plate of the invention.

The die plate is comprised of a plate backing member 40 having a die-cutting ridge 41 with a rounded upper cutting surface 42. The broadcast range of radius of the rounded upper cutting surface 42 is from about .003 inch to about .0075 inch, while the preferred range of the radius of the rounded upper cutting surface is from about .004 inch to about .006 inch. It has been found that if the lower range is below .003 inch the upper carrier layer 10 will be cut and not embossed whereas if the rounded upper cutting surface has a radius beyond .0075 inch the intermediate printing layer 11 will not be cleanly cut and would have a ragged edge with fibers extending therefrom. The height of the ridge is not critical except, of course, it would have to be of a height at least as great as the combined thickness of the outer and intermediate layers and, preferably, should be of a height greater than the combined thickness of the outer and intermediate layers to assure that the rounded outer cutting edge penetrates through the intermediate layer.

The ridge 41 forming the rounded cutting surface 42 may be formed by wire 43 of the desired configuration held in place on the facing surface of the plate 40 by means of a thin metal foil surface material 44. The metal foil 44 may be formed of C1010 AISI full steel of .0015 inch thickness known commercially as shim stock. The metal foil may be eliminated by resistance welding a metal wire to the plate 40 in the desired configuration. Alternate methods of forming the die plate could be by coining, semi-coining, embossing or even molding if the die plate is formed of synthetic plastic material. If the backing plate is formed of metal, which is preferred, suitable materials for the plate would be a sheet of C1095 carbon steel of a suitable thickness, such as .02 inch thickness, and may be hardened and tempered. If the rounded upper cutting surface 42 is formed of wire, the wire may be of any metal having a diameter of from about .006 to about .015 inch, preferably from .008 to .012 inch, and the wire is preferably annealed stainless steel. If the metal foil is used in conjunction with the wire, then the upper limit of the thickness of the wire should be decreased so that the radius of the rounded cutting surface 42 is no greater than about .0075 inch.

When the die plate 40 together with the laminar printing tape including upper layer 10, intermediate layer 11 and lower layer 12 are simultaneously drawn between suitably spaced pressure rollers 50, 51, the rounded ridge surface 42 of the die will emboss and stretch the flexible upper layer 10 without cutting it while at the same time separating the fibers and cutting the inflexible intermediate layer 11 as shown. With the physical proportions for the die and tape as shown by FIG. 4, the lower support layer 12 of the tape will not be cut but it should be understood that the lower layer 12 can be selectively cut by increasing the relative height of the die ridge 42 so that it will also penetrate and cut the lower layer 12.

Figure 5:
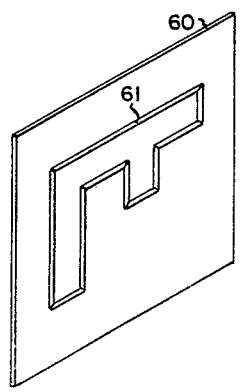
FIG. 5 is a perspective view of one form of the embossing, cutting and printing die of the invention.

FIG. 5 of the drawings shows a modified form of the die plate of the invention which is simply formed of a steel backing plate 60 having embossing and cutting ridges formed of configured wire 61 affixed thereto by resistance welding. The die plate shown by FIG. 4 of the drawings as having the outer foil surface covering 44 is presently preferred over the die plate shown by FIG. 5 since the inwardly extending surfaces 45 of the wire 43 are covered by the foil 44 and thus the tendency for the die to key or lock into engagement with the printing tape during embossing and cutting is prevented. Of course, an assortment of different die plates having various configurations of die ridge surfaces corresponding to letters, numbers and other indicia or ornamentation are provided.

While I have specifically disclosed two methods of forming the rounded cutting surface, other methods, as previously mentioned, could be utilized. Thus depending upon the hardness of the plate 40, the rounded cutting surface could be formed by coining, semi-coining, embossing or even molding, as is well known to those skilled in the art.

What is claimed is:

1. In a mechanism for forming indicia from an intermediate layer of a three layer laminar tape, the tape including an upper layer of relatively thin highly flexible sheet material capable of being stretched, the intermediate layer of sheet material being thicker and less flexible than the upper layer and a lower layer of sheet material which is harder than the intermediate layer; the improvement comprising an embossing and cutting die which, when pressed against the outer layer of the tape only embosses the same and cuts indicia from the intermediate layer, said die including a plate of relatively hard sheet material having a ridge formed thereon in the outline of indicia, said ridge having a rounded cutting surface, the radius of the rounded cutting surface being from .003 inch to .0075 inch, and said ridge having a height at least as great as the combined thickness of the outer and intermediate layers of the tape.

2. The invention of claim 1 wherein the range of the radius of the rounded cutting surface is from .004 inch to .006 inch.

3. The improvement for forming indicia, in combination, a three layer laminar tape comprising an upper layer of relatively thin highly flexible sheet material capable of being stretched, an intermediate layer of sheet material which is thicker and less flexible than the upper layer and a lower layer of sheet material which is harder than the intermediate layer; with an embossing and cutting die, said die comprising a plate of relatively hard sheet material having a raised ridge formed thereon in the outline of indicia, said ridge having a rounded outer cutting surface, the radius of the rounded cutting surface being from .003 inch to .0075 inch, and said ridge having a height at least as great as the combined thickness of the outer and intermediate layers of the tape; whereby, when said die is pressed against the outer layer of the tape, the outer layer is only embossed and the intermediate layer is cut in the shape of the raised ridge to form the indicia.

4. The improvement as set forth in claim 3 wherein the upper layer of the tape is formed of a polyester plastic.

5. The improvement as set forth in claim 3 wherein the range of the radius of the rounded cutting surface is from .004 inch to .006 inch.

References Cited

UNITED STATES PATENTS

| | | | |
|---|---|---|---|
| 2,528,540 | 11/1950 | Oldofredi | 101—32 |
| 2,549,847 | 4/1951 | Oldofredi | 101—28 |
| 3,191,525 | 6/1965 | Challey et al. | 101—28 X |
| 3,327,369 | 6/1967 | Catlin | 101—28 X |
| 2,029,567 | 2/1936 | Hough. | |
| 2,782,851 | 2/1957 | Gazette | 76—107 X |
| 2,903,748 | 9/1959 | Doherty | 264—293 X |
| 3,075,249 | 1/1963 | Sucher | 264—293 X |

WILLIAM B. PENN, Primary Examiner